UNITED STATES PATENT OFFICE.

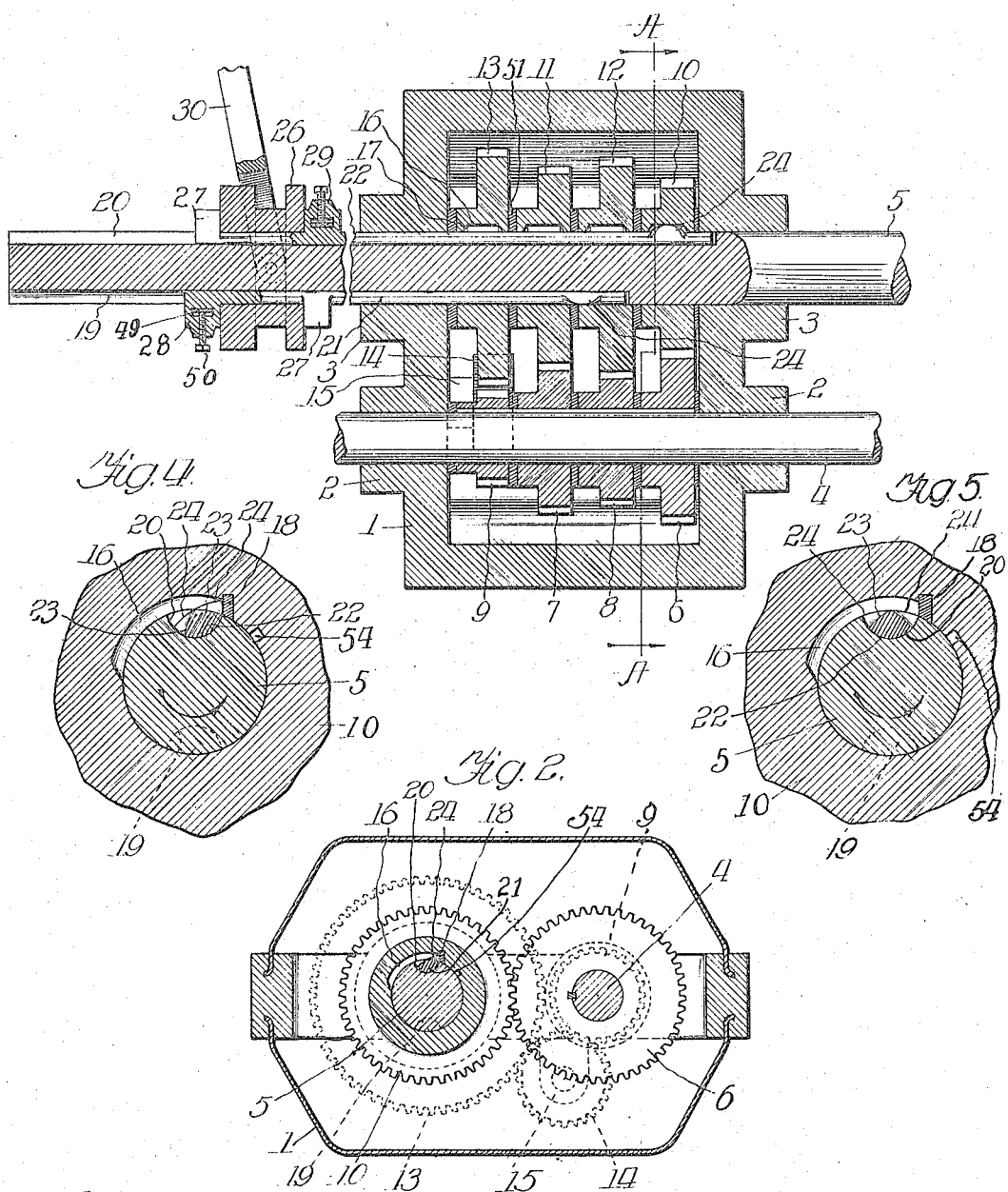

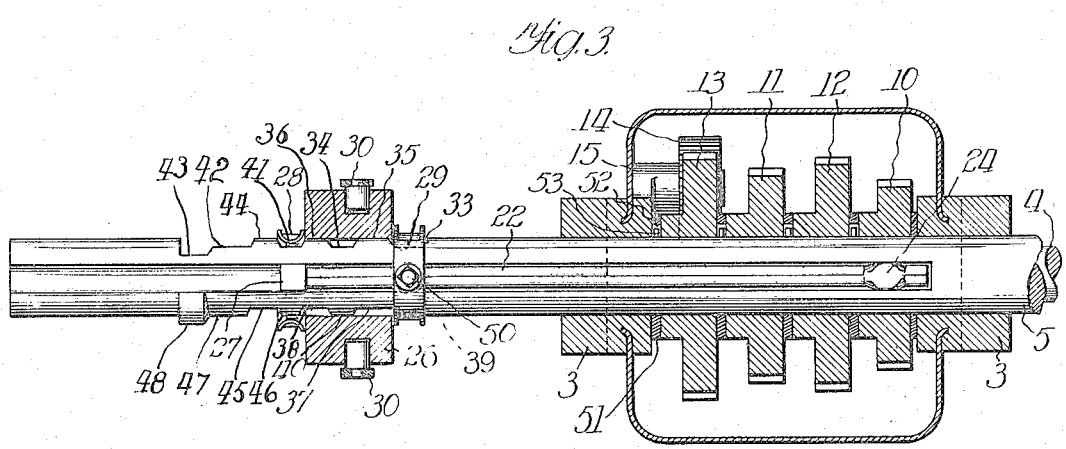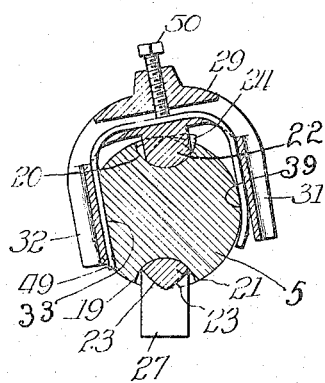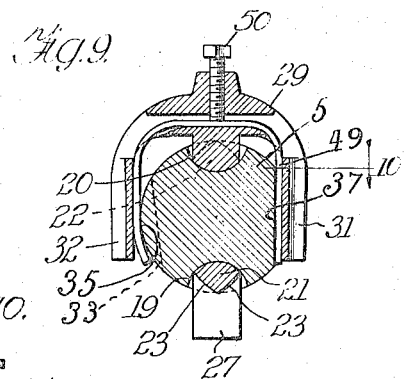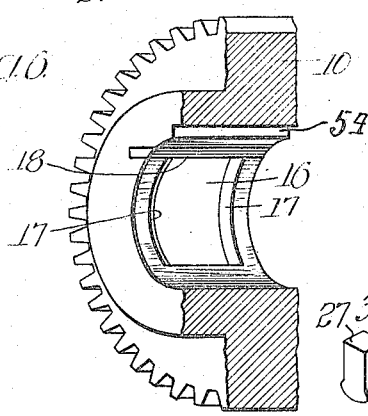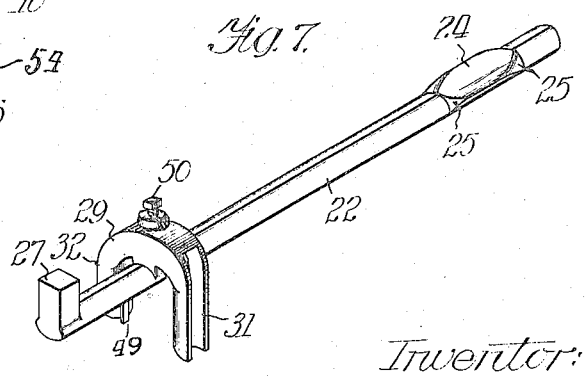

LEON J. CAMPBELL, OF CHICAGO, ILLINOIS.

TRANSMISSION-GEARING.

1,135,354.  Specification of Letters Patent.  Patented Apr. 13, 1915.

Application filed January 9, 1911. Serial No. 601,509.

*To all whom it may concern:*

Be it known that I, LEON J. CAMPBELL, a citizen of the United States, and residing at Chicago, in the county of Cook and State of Illinois, have invented a new and useful Improvement in Transmission-Gearing, of which the following is a complete specification.

The main objects of this invention are to provide an improved transmission gearing of the selective gear type; to provide a transmission gearing having improved mechanism for connecting the selective or loose gears to their shaft; to provide a transmission gearing having improved mechanism for operating the means for locking the selective gears to the shaft; to provide a transmission gearing in which the selective gears may be positively connected with their shaft without danger of injuring the parts; and to provide a very cheap, simple and durable transmission gearing which is easy to operate and not liable to get out of repair.

A specific embodiment of the invention is illustrated in the accompanying drawings, in which:

Figure 1 is a horizontal section of a transmission gearing embodied in this invention with the high speed gears locked for operation. Fig. 2 is a section taken on line A—A of Fig. 1. Fig. 3 is a vertical section taken through the bearings for the transmission shaft and showing said shaft in elevation. Fig. 4 is a fragmentary section of one of the selective gears and the transmission shaft, showing one of the locking keys in locking position. Fig. 5 is a view similar to Fig. 4 but showing the locking key in release position. Fig. 6 is a fragmentary, perspective view of one of the selective gears showing the locking seat. Fig. 7 is a perspective view of one of the locking keys and the rocking yoke therefor. Fig. 8 is a section of the transmission shaft and of one of the rocking yokes with the latter holding the key in locking position. Fig. 9 is a view similar to Fig. 8 but with the rocking yoke holding the key in release position. Fig. 10 is an enlarged section of one of the yoke arms taken on line 10 of Fig. 9.

In the construction shown, the gear casing 1 is provided with bearings 2 and 3 in which are journaled the drive shaft 4 and the transmission shaft 5. Rigidly secured upon one of said shafts, as herein shown the drive shaft 4, is a plurality of drive gears 6, 7, 8 and 9, which decrease in size in the order named.

Loosely mounted upon the transmission shaft 5 is a plurality of selective or loose gears 10, 11, 12, and 13, which increase in size in the order named. The loose gears 10, 11 and 12 mesh with the drive gears 6, 7, and 8, respectively, and provide the forward speeds for the transmission shaft. The loose gear 13, which is the reverse gear meshes with an idle pinion 14 which is journaled in a bearing 15 on the casing and meshes with the drive gear 9. Each of the gears 10, 11, 12, and 13 is provided in its bore with a locking recess 16 which extends circumferentially of the bore a sufficient distance to permit the locking mechanism to act properly, and is provided with flaring or beveled sides 17. At the rear end of each recess, that is the end directed away from the direction of rotation of the gear, is a steel abutment plate 18 which is adapted to take the wear of the locking mechanism on the gear.

Extending longitudinally of the shaft 5 is a pair of key seats 19 and 20 which are circular in cross section, and in which are the locking keys 21 and 22. Said keys are rounded on their inner sides complementally with the key seats so as to permit them to rock freely in their seats, and have their outer corners cut away, as at 23, for the greater portion of their lengths so that they will not project out of the seats beyond the periphery of the shaft in any position of the key. The remaining portion of the key, forming the locking lug 24, is curved transversely on its outer face in the same arc as the circumference of the shaft 5, so that when the key is in release position, as is shown in Fig. 5, said portion or lug will be flush with the periphery of the shaft, and the loose gears may travel over the same and rotate freely on the shaft. Said lugs are of length to fit transversely of the locking recesses 16 when they are brought into register with said recesses, and when in that position the keys may be rocked to turn one edge of the lug up into the recess in position to abut against the abutment plate 18, as shown more clearly in Figs. 2 and 4, thereby locking the gear to the shaft. The ends 25 of the lateral edges or corners of the lugs are beveled longitudinally of the key to bear against the beveled sides 17 of the recesses 16, so that when the key is in locking position, with one edge turned up into the recess 16, longitudinal movement of the key will cause the beveled portion 25 of the lug to bear against the beveled portion 17 of the recess, and since the beveled portion 25 is off center on the key, the key will be rocked back to normal position where it may be moved longitudinally of the shaft. For the purpose of moving the keys longitudinally of the shaft to bring the locking lugs 24 into and out of locking position with respect to the various loose gears, a grooved collar 26 is loosely mounted on the shaft 5 outside of the casing 1, and the outer ends of the keys 21 and 22 extend through the collar. The key 21 is provided with a boss 27 near its outer end and with a yoke 28 at its outer end and the key 22 is provided with a boss 27 at its outer end and a yoke 29 near its outer end. The collar 26 is mounted on the shaft between the lugs and yokes, with the latter situated on opposite sides thereof, so that when the collar is moved longitudinally of the shaft it will move the keys therewith. A forked lever 30 is connected with the collar 26 which is slidably mounted on the shaft. The lever is adapted to operate the keys by moving the collar on the shaft. The lugs 24 are so situated on the keys that both cannot be in locking position at the same time, and so that the lug on the key 22 will lock the gears 10 and 12 to the shaft 5, and the lug on the key 21 will lock the gears 11 and 13 to the shaft. The yokes 28 and 29 are off center on the keys, that is the arm 31 of each yoke, or the arm which is on the same side of the key as the locking edge of the lug 24, is nearer the center of the key than is the arm 32, and the distance between the arms is less than the diameter of the shaft 5. Said yokes are adapted to rock the keys 21 and 22 to bring the lugs 24 into and out of locking position. For this purpose the yokes straddle the shaft, which is provided on its sides along those portions over which the yokes travel with a plurality of oppositely disposed notches and shoulders which are adapted to rock the yoke. The collar 26 is of sufficient length to separate the yokes far enough apart so that neither yoke can travel in the notches of the other yoke, and the notches are so disposed that when one key is in locking position the other will be out of locking position, and so that there will be an interval between each two selective gears when neither key will be in locking position and all of the gears will run idle.

To operate the yoke 29 the shaft 5 is provided in one side with notches 33 and 34 and shoulders 35 and 36, and in the other side with notches 37 and 38 and shoulders 39 and 40, the notches in one side being disposed oppositely to the shoulders on the other side. To operate the yoke 28, the shaft is provided in one side with notches 41, 42, and 43, and a shoulder 44, and in the other side with a notch 45 and shoulders 46, 47, and 48, which are likewise oppositely disposed, and the notches and shoulders for the yoke 28 are arranged in the reverse order to those for the yoke 29. The shoulders, with the exception of the shoulder 48, are provided by the surface of the shaft adjacent to the notches, while the shoulder 48 is provided by a piece attached to the side of the shaft, and the notch 43, which is opposite the shoulder 48, is deeper than the other notches so as to throw the yoke 28 in the reverse direction to lock the reverse gear 13 to the shaft 5. The inner faces of the yoke arms are rounded or beveled, and the sides of the notches are beveled so that when the collar 26 is moved longitudinally of the shaft the yoke arms will travel easily out of the notches and onto the shoulders and rock the keys into and out of locking position.

For the purpose of securing a quick rocking action of the keys, especially when the keys are being thrown to locking position, a U shaped spring 49 is carried in an aperture in the central portion of the yoke which extends transversely of the key. The spring is held in the yoke by means of a set screw 50 which is carried in the central portion of the yoke and bears on the spring. The sides of the spring lie in recesses in the inner faces of the yoke arms to points about diametrically opposite on the shaft, and then said sides normally turn inwardly from the arms, in such a position that when the arm is on a shoulder or rounded portion of the shaft, the end of the spring will not be compressed but will curve beneath the shaft, and when the arm is in a notch the end of the spring will be compressed by the arm against the bottom of the notch.

For the purpose of preventing the lugs 24 from causing the selective gears to wear eccentric when the lugs are out of locking position, washers 51 of hard metal are interposed between the gears and each is provided with a notch 52 which opens from the aperture in the washer and is adapted to receive a pin 53 on the shaft which causes the washer to rotate with the shaft. Each of the loose gears is provided with a notch 54 which permits the gear to be passed over the pin 53 into position on the shaft 5.

The operation of the construction shown is as follows: When the parts are in the positions shown in the drawings, the gear 10 is locked to the shaft 5, and the gears 11, 12, and 13 are running idle. In this position the arm 32 of the yoke 29 is in the notch 33 of the shaft 5, and the arm 31 is resting on the shoulder 39, and the lug 24 of the key 22 is turned into the locking recess of the gear 10. The end of the spring 49 adjacent to the arm 32 is compressed against the bottom of the notch 33 and tends to rotate the key back to normal position. The other end of the spring is relaxed, since it is out of contact with the shaft. Also in this position the arm 32 of the yoke 28 is on the shoulder 46 and the arm 31 is in the notch 41, and the lug 24 of the key 21 is held in release position at a point between the recesses 16 of the gears 12 and 11, but nearer the recess in the gear 12. When the collar 26 is moved away from the gear casing the beveled portion 25 of the lug 24 engages the beveled edge of the recess 16 of the gear 10 and tends to rotate the key 22 back to normal or release position, and at the same time the arm 31 of the yoke 29 passes off the shoulder 39 into the notch 37, and the arm 32 of said yoke passes out of the notch 33 onto the shoulder 35, thereby assisting in turning the key 22 back to normal position and retracting the lug 24 into the key seat 20. This movement compresses the end of the spring 49 against the arm 31 of the yoke 29 and relaxes the opposite end of the spring. The yoke 28 moves simultaneously with the yoke 29, and at the point where the lug 24 of the key 22 has just passed out of the locking recess of the gear 10, the lug 24 of the key 21 is about to enter the recess of the gear 11, and none of the gears are locked to the shaft. Further movement of the collar 26 in the same direction brings the arm 32 of the yoke 28 into the notch 45 and the arm 31 of said yoke onto the shoulder 44, thereby rotating the key 21 to bring its lug 24 to locking position to lock the gear 11 on the shaft. Further outward movement of the collar causes the key 22 to lock the gear 12 to the shaft, and still further movement causes the arm 32 of the yoke 28 to travel onto the shoulder 48 and the arm 31 of said yoke to travel into the notch 43, thereby rocking the key 21 in the reverse direction to lock the reverse gear 13 to the shaft. When the collar 26 is moved in the opposite direction on the shaft 5 the keys 21 and 22 travel inwardly and lock the gears in the reverse order. There is a point between each two adjacent gears where both keys are out of locking position, with the result that no power is then applied to the shaft 5.

The casing 1 is a closed casing and its construction is made the subject of a separate application filed Jan. 9, 1911, Serial No. 601,508.

As clearly shown in the drawings, and especially in Fig. 4 thereof, the locking lug 24 of each key has a contact face adapted, when the lug is in operative position, namely, extending beyond the circumferential surface of the shaft 5, to be in contact with the shoulder formed by the abutment plate 18. As shown in Figs. 4 and 5, the face of said abutment plate 18, with which the contact face of said lug 24 contacts or engages, is preferably flat. Said abutment plate 18 is arranged in such manner that its lug-engaging face extends upwardly and is inclined inwardly toward a vertical plane passing through both the axes of rotation of the shaft 5 and the key 22, so that the pressure coming on said lug will act in a line oblique to a radial line passing through the axis of rotation of the lug and in a direction to press the opposite curved side of the lug against the concave surface of the key seat 20 with which said opposite side is in contact. The contact face of the lug constitutes the shoulder-engaging portion of said lug. The base of said contact face of the lug or shoulder-engaging portion thereof is at the junction of said portion with the curved part of the lug in the key seat 20. When the lug is in locking position, as shown in Fig. 4, a line drawn across the lug-engaging face of said abutment plate 18, in a direction toward the opposite side of the shaft 5, will pass at a point laterally spaced a considerable distance radially from the axis of rotation of said shaft, as will be plainly evidenced upon examination of Figs. 4 and 5 of the drawings. The contact face or shoulder-engaging portion of said lug is complementary to the face of said plate 18 which said contact face of said lug engages. An important advantage is gained by this construction in the locking lug, which will appear from the following: If the said contact face or shoulder-engaging portion were on a line radial to the shaft, the pressure of the locking shoulder on the lug would tend to press the lug in the direction of a line tangential to the surface of the shaft, and such pressure would tend to shear or break off the part of the lug which projects outside of the circumference of the shaft, because the direct pressure of the shoulder would then be unresisted by the abutting of the lug against any opposed resisting surface of the shaft. When, however, the lug and shoulder 18 are arranged and made as described and shown, (the shoulder or plate 18 being at an inclination to the direction of rotation of said shaft 5), the pressure of the locking shoulder against the shoulder-engaging portion of the lug, tends to press or force the lug directly toward the opposite concave side of its seat, so that the tension or strain on the lug is entirely a compressive one, tending to crush the lug, and not to shear or break off its part which projects from the shaft and engages said locking shoulder on the wheel. The lug made as described, therefore, is capable of withstanding, without injury, a pressure greatly in excess of that which it would withstand if subject to a breaking or shearing strain only. This feature of construction in the lug is applicable to any form of clutch having a rocking or oscillating locking lug, and forms the subject matter of my co-pending application Serial No. 834,075, filed April 24, 1914, the same being a division of the present application.

While I have shown and described but one specific embodiment of my invention it will be understood that various details of the construction may be varied or omitted without departing from the scope of the claims.

I claim:

1. A transmission gearing, comprising a shaft, a plurality of gears loosely mounted on the shaft, a key movable longitudinally of the shaft, and means adapted when the key is moved longitudinally to rock the key into and out of engagement with the gears.

2. A transmission gearing, comprising a shaft, a plurality of loose gears on the shaft, and a key movable longitudinally of the shaft and adapted to engage a part on said gears and lock them to the shaft, there being coacting means on the shaft and key adapted to rock the key into and out of engagement with the gears.

3. A transmission gearing, comprising a shaft, a plurality of gears loosely mounted on the shaft and each having a locking recess therein, a longitudinally movable key on the shaft and having a lug thereon adapted to engage in said recesses and lock the gears to the shaft, there being coacting parts on said lug and recesses adapted when the key is moved longitudinally to rotate the key and withdraw the lug from the recesses, means for moving the key longitudinally, and means for rotating said gears.

4. A transmission gearing, comprising a shaft, a plurality of gears loosely mounted on the shaft and having beveled recesses opening toward the shaft, a key longitudinally movable on the shaft, and having a lug adapted to engage in said recesses when the key is rotated to one position, said lug having beveled ends adapted to engage the beveled portions of the recesses, means adapted to move the key longitudinally and cause the beveled portions of the lug and recess to rock the key and withdraw the lug from the recess, and means for rotating the gears.

5. A transmission gearing, comprising a shaft, a plurality of internally recessed gears loosely mounted on the shaft, a key movable longitudinally of the shaft and adapted to lock the gears to the shaft, there being coacting means on the keys and recesses adapted when the key is moved longitudinally to rock the key on the shaft and release the gears, and means for rotating said gears.

6. A transmission gearing, comprising a shaft having keyways extending longitudinally thereof, a plurality of internally recessed gears loosely mounted on the shaft, keys in said keyways, and having means thereon adapted to engage in the recesses of the gears and lock the gears to the shaft, means for moving the keys longitudinally of the shaft, there being coacting means on the shaft and keys adapted to rock the keys in their seats to move them into and out of engagement with the gears, and means for rotating said gears.

7. A transmission gearing, comprising a shaft having longitudinal keyways therein, gears loosely mounted on the shaft and having recesses opening to the shaft, keys in said keyways, each key having a lug adapted to engage in the recesses in the gears, and means for rotating the gears, there being coacting means on the shaft and keys adapted to rock the keys in the keyways and move the keys into and out of engagement with the recesses.

8. A transmission gearing, comprising a shaft having keyways therein, gears loosely mounted on the shaft, keys in said keyways, there being coacting means on the keys, and shaft adapted to rock the keys when the keys are moved longitudinally of the shaft, and there being coacting means on the gears and keys adapted when the keys are rocked to lock and release the gears with respect to the shaft.

9. A transmission gearing, comprising a shaft having keyways therein, gears loosely mounted on the shaft, keys in said keyways, there being coacting means on the keys and gears adapted to lock the gears to the shaft, and a yoke on each key, said shaft having means thereon adapted to engage the yokes and rock the keys into and out of locking position when the keys are moved longitudinally of the shaft.

10. A transmission gearing, comprising a shaft having keyways therein, gears loosely mounted on the shaft, longitudinally movable keys in the keyways, there being coacting means on the gears and keys adapted to lock the gears to the shaft, a yoke on each key, there being alternating shoulders and notches on the shaft adapted to rock the yokes and throw the keys into and out of locking engagement with the gears, and means for rotating the gears.

11. A transmission gearing, comprising a shaft having keyways therein, gears loosely mounted on the shaft, longitudinally movable keys in the keyways, there being coacting means on the gears and keys adapted to lock the gears to the shaft, a yoke on each key, said shaft having alternating shoulders and notches adjacent to the yokes adapted to rock the yokes and throw the keys into and out of locking engagement with the gears, springs in said yokes adapted to engage the shaft and rock the yokes with a quick action, and means for rotating the gears.

12. A transmission gearing, comprising a shaft, a plurality of rotative members mounted and adapted to turn on said shaft, and a key movable longitudinally of the shaft and means adapted to rock the key into and out of position for engagement with said rotative members.

13. A transmission gearing, comprising a shaft having a keyway therein, gears loosely mounted on the shaft and having locking recesses opening to the shaft, a rotatable key in said keyway having a lug thereon adapted to rock into and out of said recesses, and means for moving the key longitudinally.

14. A transmission gearing, comprising a shaft having a keyway therein, a plurality of gears loosely mounted on the shaft and each having a locking recess opening into its bore, a rockable key mounted in the keyway and having a lug thereon adapted to be rocked into and out of said recesses, and means adapted to move the key longitudinally of the shaft and shift the lug from gear to gear.

15. A transmission gearing, comprising a shaft having a keyway therein, a plurality of gears loosely mounted on the shaft and each having a locking recess opening into its bore, a rockable key mounted in the keyway and having a lug thereon adapted to be rocked into and out of said recesses, said key being provided with means adapted to engage parts on the shaft and rock the key when the key is moved longitudinally, and means adapted to move the key longitudinally of the shaft and shift the lug from gear to gear.

16. A transmission gearing, comprising a shaft having circular keyways therein, gears loosely mounted on the shaft, keys in said keyways, means adapted to move the keys longitudinally of the shaft, said keys being provided with means adapted to engage parts on the shaft when the keys are moved longitudinally and rock the keys in the keyways, there being coacting means on the keys and gears adapted to lock the gears to the shaft, and means for rotating the gears.

In testimony whereof I have hereunto subscribed my name in the presence of two witnesses.

LEON J. CAMPBELL.

Witnesses:
RUPERT J. BARRY,
W. W. WITHENBURY.